US010045306B2

(12) United States Patent
Tarlazzi et al.

(10) Patent No.: US 10,045,306 B2
(45) Date of Patent: Aug. 7, 2018

(54) SELF-OPTIMIZING NETWORK ENTITY FOR A TELECOMMUNICATIONS SYSTEM

(71) Applicant: CommScope Technologies LLC, Hickory, NC (US)

(72) Inventors: Luigi Tarlazzi, Bagnacavallo (IT); Maurice D'Souza, Plano, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/120,275

(22) PCT Filed: Feb. 19, 2015

(86) PCT No.: PCT/US2015/016534
§ 371 (c)(1),
(2) Date: Aug. 19, 2016

(87) PCT Pub. No.: WO2015/127021
PCT Pub. Date: Aug. 27, 2015

(65) Prior Publication Data
US 2017/0064642 A1    Mar. 2, 2017

Related U.S. Application Data

(60) Provisional application No. 61/942,816, filed on Feb. 21, 2014.

(51) Int. Cl.
*H04W 52/24* (2009.01)
*H04B 17/19* (2015.01)
(Continued)

(52) U.S. Cl.
CPC .......... *H04W 52/241* (2013.01); *H04B 17/19* (2015.01); *H04W 52/248* (2013.01);
(Continued)

(58) Field of Classification Search
CPC ..... H04W 24/02; H04W 52/36; H04W 52/40; H04W 52/42; H04W 52/241;
(Continued)

(56) References Cited

U.S. PATENT DOCUMENTS 5,805,983 A * 9/1998 Naidu .................. H04B 7/0894
455/503
2004/0096222 A1 5/2004 Cagenius
(Continued)

OTHER PUBLICATIONS

International Search Authority, "International Search Report and Written Opinion from PCT Application PCT/US2015/016534", dated May 19, 2015, pp. 1-11, Published in: WO.
(Continued)

*Primary Examiner* — Raymond Dean
(74) *Attorney, Agent, or Firm* — Fogg & Powers LLC

(57) ABSTRACT

Certain features relate to systems and methods for optimizing the radio frequency characteristics of signals transmitted between a radio base station (RBS) and a distributed antenna system (DAS). A self-optimizing network (SON) entity can determine adjustments to radio frequency operations and management parameters at the RBS based on radio frequency parameters measured by a measurement and configuration module at the DAS. Adjustments to radio frequency operations and management parameters can include adjustments configured to compensate for signal latency caused by the DAS. Adjustments to radio frequency operations and management parameters can also include adjustments to signal gain due to noise rise caused by the DAS. The SON entity can also measure nominal receive power levels for the RBS for purposes of open loop power control.

20 Claims, 4 Drawing Sheets

(51) Int. Cl.
| | |
|---|---|
| H04W 52/36 | (2009.01) |
| H04W 52/42 | (2009.01) |
| H04W 52/40 | (2009.01) |
| H04W 88/08 | (2009.01) |
| H04B 17/345 | (2015.01) |
| H04B 7/022 | (2017.01) |
| H04W 84/18 | (2009.01) |

(52) U.S. Cl.
CPC ............. *H04W 52/36* (2013.01); *H04B 7/022* (2013.01); *H04B 17/345* (2015.01); *H04W 52/40* (2013.01); *H04W 52/42* (2013.01); *H04W 84/18* (2013.01); *H04W 88/085* (2013.01)

(58) Field of Classification Search
CPC . H04W 52/248; H04W 84/18; H04W 88/085; H04B 17/19; H04B 7/022; H04B 17/345
See application file for complete search history.

(56) References Cited

U.S. PATENT DOCUMENTS

| | | |
|---|---|---|
| 2011/0306380 A1 | 12/2011 | Zavadsky et al. |
| 2012/0309328 A1* | 12/2012 | Morrison ............... H04B 1/525 455/78 |
| 2012/0329523 A1 | 12/2012 | Stewart et al. |
| 2013/0071112 A1 | 3/2013 | Melester et al. |
| 2013/0095870 A1* | 4/2013 | Phillips ............... H04W 52/146 455/501 |
| 2013/0122830 A1 | 5/2013 | Wang et al. |
| 2013/0201916 A1 | 8/2013 | Kummetz et al. |
| 2013/0272202 A1 | 10/2013 | Stapleton et al. |
| 2014/0024402 A1 | 1/2014 | Singh |
| 2015/0098350 A1* | 4/2015 | Mini .................... H04W 24/10 370/252 |

OTHER PUBLICATIONS

European Patent Office, "Extended European Search Report for EP Application No. 15752684.9", "From U.S. Appl. No. 15/120,275", dated Aug. 7, 2017, pp. 19, Published in: EP.

European Patent Office, "EP Office Action from EP Application No. 15752684.9 dated May 2, 2018" From Foreign Counterpart of U.S. Appl. No. 15/120,275; pp. 1-6; Published in EP.

\* cited by examiner

SELF-OPTIMIZING NETWORK ENTITY FOR A TELECOMMUNICATIONS SYSTEM

CROSS-REFERENCE TO RELATED APPLICATION

This application is a U.S. National Stage application of PCT Application Ser. No. PCT/US2015/016534, filed Feb. 19, 2015 and titled "A Self-Optimizing Network Entity For A Telecommunications System," which claims the benefit of U.S. Provisional Application Ser. No. 61/942,816, filed Feb. 21, 2014 and titled "A Joint Radio Access Network-Distributed Antenna System Self Optimizing Network Entity for Radio Frequency Interface," the contents of all of which are incorporated herein by reference.

TECHNICAL FIELD

The disclosure relates generally to telecommunications and, more particularly (although not necessarily exclusively), to management and optimization of a radio access network and a distributed antenna system using a self-optimizing network entity.

BACKGROUND

A distributed antenna system (DAS) can include one or more head-end units and multiple remote units coupled to each head-end unit. A DAS can be used to extend wireless coverage in an area. Head-end units can communicate with one or more radio base stations of a radio access network (RAN). Each radio base station can be part of a separate node of the RAN. A head-end unit can receive downlink signals from the radio base station and distribute downlink signals in analog or digital format to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to a head-end unit. The head-end unit can transmit uplink signals to the serving radio base stations. The DAS may provide coverage extension for communication signals from the radio base stations.

Optimizing both the DAS and the radio base station can be difficult in part because these are separate units.

SUMMARY

In one aspect, a method is provided. The method can include measuring radio frequency parameters of radio frequency communications between a head-end unit and a remote unit of a distributed antenna system (DAS). The method can also include sending measurements of the radio frequency parameters to a self-optimizing network (SON) entity. The method can further include determining, by the SON entity, adjustments to operations and management parameters of the RBS using the measurements of the radio frequency parameters. The method can further include sending commands to the RBS for changing the operations and management parameters of the RBS using the adjustments determined by the SON entity In another aspect, a SON entity is provided. The SON entity can include a first operations and management interface configured to receive measurements of radio frequency parameters from a head-end unit of DAS. The SON entity can also include an analysis module configured to determine adjustments to operations and management parameters of a RBS using the measurements of the radio frequency parameters. The SON entity can further include a second operations and management interface configured to send commands to the RBS for changing the operations and management parameters of the RBS using the adjustments determined by the analysis module.

In another aspect, a telecommunications system is provided. The telecommunications system can include one or more remote units of a DAS. The telecommunications system can also include a head-end unit of the DAS. The head-end unit is configured to measure radio frequency parameters of the DAS and to provide wireless communications to the one or more remote units of the DAS. The telecommunications system can also include a SON entity communicatively coupled to the head-end unit. The SON entity is configured to receive measurements of the radio frequency parameters measured by the head-end unit and determine adjustments to operations and management parameters of a RBS using the measurements of the radio frequency parameters. The SON entity is also configured to send commands to the RBS for changing the operations and management parameters of the RBS using the determined adjustments.

DETAILED DESCRIPTION

Figure 1:
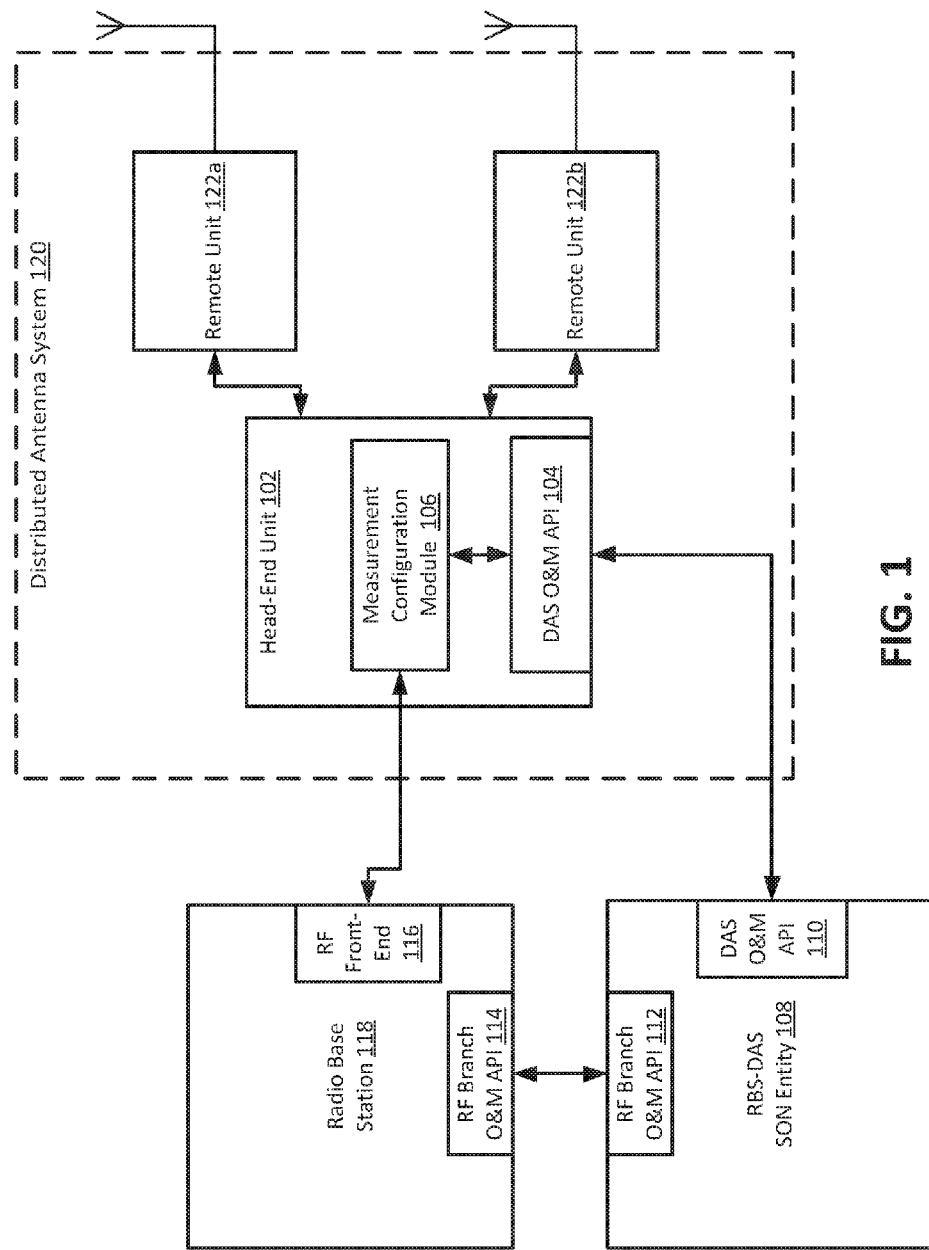
FIG. 1 is a block diagram of an example of a radio base station (RBS) and a distributed antenna system (DAS) communicatively coupled to a self-optimizing network (SON) entity according to one aspect of the present disclosure.

Certain aspects and features relate to optimizing the radio frequency characteristics of signals transmitted between a radio base station (RBS) and a distributed antenna system (DAS). For example, a self-optimizing network (SON) entity can be communicatively coupled to the DAS head-end unit and the RBS. The head-end unit of the DAS can measure certain radio frequency parameters specific to the performance of the DAS and provide the measured radio frequency parameters to the SON entity. For example, the measured radio frequency parameters can be parameters of the radio frequency communications between the head-end unit and remote units of the DAS. The SON entity can determine adjustments to operations and management parameters of the RBS using the radio frequency parameters.

For example, adjustments to the operations and management parameters can include adjustments to the uplink RBS gain. Increasing the radio frequency gain of received uplink signals at the RBS can compensate for noise generated by the DAS. Adjustments to the operations and management parameters can also include adjustments to the radio frequency branch delay of received uplink signals at the RBS. Adjusting the radio frequency branch delay at the RBS can compensate for signal latency from the DAS (e.g., the transmit time delay resulting from radio frequency signals traveling from the base station to remote units and back). Adjustments to operations and management parameters can also provide an open loop power control mechanism, where the SON entity can specify the nominal receive power level of the RBS. If the SON entity specifies a higher nominal received power level, the SON entity can instruct the head-end unit to increase uplink gain for providing signals to the RBS. While non-limiting examples to adjustments of RBS operations and management parameters are mentioned above, other adjustments are also possible.

Adjusting operations and management parameters of an RBS using measured radio frequency parameters from the DAS can offset any impairment in the radio frequency path from the RBS to DAS remote units. Optimizing the operations and management characteristics of the RBS through a SON entity can facilitate communication between the RBS, DAS head-end units, and DAS remote units and reduce network delays caused by independently optimizing the RBS and DAS. In some aspects, the SON entity can periodically and automatically re-optimize the radio frequency characteristics of the RBS and DAS so that the signals between the RBS and DAS are continually tuned for optimal performance.

While the above examples describe a SON entity that uses radio frequency characteristics measured from a DAS to send commands regarding operations and management characteristics to an RBS, other aspects include a SON entity that uses radio frequency characteristics measured at an RBS to send commands regarding operations and management parameters to the DAS head-end unit. For example, the RBS can provide its transmit power level to the SON entity. Using the transmit power level of the RBS, the SON entity can instruct the DAS head-end unit to set its input radio frequency attenuation to a certain level in order to obtain the optimal input power to drive the DAS.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions may be used to describe the illustrative aspects but, like the illustrative aspects, should not be used to limit the present disclosure.

FIG. 1 is a block diagram depicting an example of a DAS 120 for being in communication with an RBS 118 and a SON entity 108. The DAS 120 can include a head-end unit 102 communicatively coupled to one or more remote units 122a-b. The head-end unit 102 can receive downlink signals from RBS 118 and transmit uplink signals to the RBS 118. Any suitable communication link can be used for communication between the RBS 118 and the head-end unit 102, such as (but not limited to) a wired link. A wired link can include, for example, a link via a copper, optical fiber, or other suitable communication medium. When communicating via a wired link, the radio frequency front-end can include a PHY interface for connecting radio frequency coaxial cables. The head-end unit 102 can also include equipment associated with a point-of-interface to receive radio frequency communications from the radio frequency front-end 116. The head-end unit 102 can implement radio frequency signal conditioning on received downlink signals from the RBS 118. Signal conditioning may include attenuation, coupling, splitting, or radio frequency routing functions.

In some aspects, the head-end unit 102 can combine downlink signals received multiple radio base stations. Multiple radio base stations allow the DAS 120 to receive wireless communication from multiple cells, different carrier frequencies, and different wireless service providers. In some aspects, the RBS 118 can include duplexed radio frequency output ports at the radio frequency front-end 116, allowing the downlink and uplink radio frequency chains to be treated independently within the DAS 120.

The head-end unit 102 can transmit the combined downlink signals to the remote units 122a-b. While two remote units 122a-b are shown for illustrative purposes, any number of remote units 122 can be communicatively coupled to the head-end unit 102. The remote units 122a-b can provide signal coverage to user devices positioned within the coverage zones by transmitting downlink signals to the user devices and receiving uplink communication signals from the user devices. The head-end unit 102 can combine uplink signals received from remote units 122a-b for transmission to the RBS 118.

The head-end unit 102 can include a measurement and configuration module 106 that can measure and configure DAS radio frequency parameters. Additionally, the measurement and configuration module 106 can configure radio frequency parameters in the DAS 120 by adjusting, for example, the uplink gain and downlink gain of signals transmitted by the head-end unit 102 and remote units 122a-b.

Radio frequency parameters of the DAS 120 measured by the measurement and configuration module 106 can be provided to the SON entity 108 via a DAS operations and management application programming interface (API) 104 included in head-end unit 102. In some aspects, the DAS head-end unit 102 can include a master controller that implements the operations and management functions of the DAS 120. The interface between the DAS master controller/ DAS head-end unit 102 and the SON entity 108 can be based on a Simple Network Management (SNMP) protocol or other network management protocol.

While FIG. 1 depicts the SON entity 108 separate from the RBS 118 and the DAS 120, in some aspects, the SON entity 108 can be embedded within the head-end unit 102. In further aspects, the SON entity 108 can be embedded within the RBS 118.

The SON entity 108 can include a corresponding operations and management API 110 to communicate with the head-end unit 102. The SON entity 108 can also include a radio frequency branch operations and management API 112 for communicating with the RBS 118. Similar to the interface between the SON entity 108 and the RBS 118 can be based on the SNMP protocol or any other network management protocol. The RBS 118 can include a corresponding radio frequency branch operations and management API 114 for receiving instructions from the SON entity 108.

The operations and management APIs 104, 110, 112, and 114 can include any software or hardware interface for providing information. For example, the RBS 118, head-end unit 102, and SON entity 108 can each include a respective processing device executing program code defining operations of the respective RBS 118, head-end unit 102, and SON entity 108. The radio frequency branch operations and management APIs 112 and 114 can include software interfaces allowing the SON entity 108 to communicate with the appropriate software modules executing in the RBS 118. For example, the radio frequency branch operations and management API 114 can be a network management interface based on the SNMP protocol, SOAP protocol, or other suitable network management protocol. If the SON entity is located near the RBS 118 and the DAS head-end unit 102, the communication can also be implemented through any serial interface (e.g., RS232, RS485), or an Ethernet cable. The SON entity 108 can, via the radio frequency branch operations and management API 112, transmit commands to the RBS 118 instructing the appropriate software module executing in the RBS 118 to adjust relevant operations and management parameters. Operations and management APIs 104, 110 can include similar software interfaces for communicating between relevant software modules executing in the head-end unit 102 and SON entity 108, respectively. The radio frequency operations and management API 112 can also be used to control the operation of the radio frequency front-end 116, providing the SON entity 108 the control of the power amplifiers, attenuators, filters, and other radio frequency components of the RBS 118.

Using the radio frequency parameters measured by the measurement and configuration module 106, the SON entity 108 can adjust radio frequency operations and management parameters of the RBS 118. The SON entity 108 can support self-optimizing procedures at the radio frequency level for the radio base stations that are coupled to the DAS 120. For example, the radio frequency branch operations and management API 114 can provide to the SON entity 108 a variety of programmable parameters. Non-limiting examples of programmable parameters included in the radio frequency branch operations and management API 114 include the number of radio frequency parameters transmitted by the RBS 118, the downlink and uplink radio frequency branch gains, a radio frequency branch delay adjustment, a nominal receive power level, and radio frequency output power.

In some aspects, the radio frequency branch operations and management API 114 can also provide measured radio frequency characteristics specific to the RBS 118 to the SON entity 108. For example, the radio frequency branch operations and management API 114 can provide information indicating the downlink and uplink differential delay between radio frequency branches of the RBS 118, downlink and uplink radio frequency branch attenuation of the RBS 118, the uplink received signal strength level, and the uplink received total wideband power. Using the measured radio frequency parameters from the RBS 118, the SON entity 108 can further optimize radio frequency characteristics of the signals provided to the DAS 120. For example, the SON entity 108 can manage or optimize delay adjustments between any MIMO radio frequency branches (e.g., adjust for signal delays caused by multiple radio base stations transmitting in a MIMO configuration).

In some aspects, the head-end unit 102 can measure the relative delay between MIMO branches of the RBS 118 (the relative delay caused for example to the different cable lengths of the MIMO branches coupling the RBS 118 to the DAS 120). The head-end unit 102 can report the relative delay back to the SON entity 108. The SON entity 108 can compute the proper time delta required to realign the MIMO branches in order to minimize the relative delay and provide the adjusted time delta values to the head-end unit 102. The DAS head-end unit 102 can receive the adjusted time delta values via the DAS operations and management API 104. The measurement and configuration module 106 can adjust for the relative delay of MIMO signals from the RBS 118 by applying the received delta adjustment values from the SON entity 108. For example, in a digital DAS head-end unit 102, analog-to-digital conversion (ADC) units can digitize the RBS 118 radio frequency downlink signals associated to each antenna port of the RBS 118 coupled to the DAS head-end unit 102. The delay between the MIMO signals can be equalized by properly setting the digital buffering stages following the ADC units for each MIMO signal. The measurement and configuration module 106 can set digital shift registers containing the digital samples of each MIMO signal. A time shift equal to the measured time delta between the MIMO signals can be applied to the shift register containing the samples of a given MIMO signal in order to compensate for the reported time delta.

In other aspects, the SON entity 108 can monitor all parameters related to radio frequency downlink/uplink paths of the DAS 120 and RBS 118 and adjust the DAS 120 based on the measured radio frequency parameters. For example, the RBS 118 can continuously or periodically report the measured received total wideband power of the RBS 118 and DAS 120 to the SON entity 108. Based on the total wideband power and the target uplink noise power known by the SON entity 108, the SON entity 108 can instruct the measurement and configuration module 106 to adjust the DAS uplink gain (e.g., the gain of uplink signals transmitted by head-end unit 102). As another example the SON entity 108 can use RBS 118 transmit power levels to optimize the input power of the DAS 120. The DAS 120 can, in some aspects operate most efficiently at certain input power levels. Using the transmit power level of the RBS 118, the SON entity 108 can optimize the radio frequency operations and management parameters of the DAS 120 by sending instructions to the head-end unit 102 to attenuate or amplify incoming downlink signals from the RBS 118.

The SON entity 108 can be implemented as a combination of hardware, software, or firmware to be stored or executed by a computing device, such as a server platform. In some aspects, the SON entity 108 can be remotely positioned with respect to the head-end unit 102. In other aspects, the SON entity 108 can be included as a software module in the head-end unit 102 and can be executed by a microprocessor hosted in the head-end unit 102. In other aspects, the SON entity 108 can be embedded as a software module in the RBS 118 and can be executed by a microprocessor hosted in the RBS 118.

Figure 2:
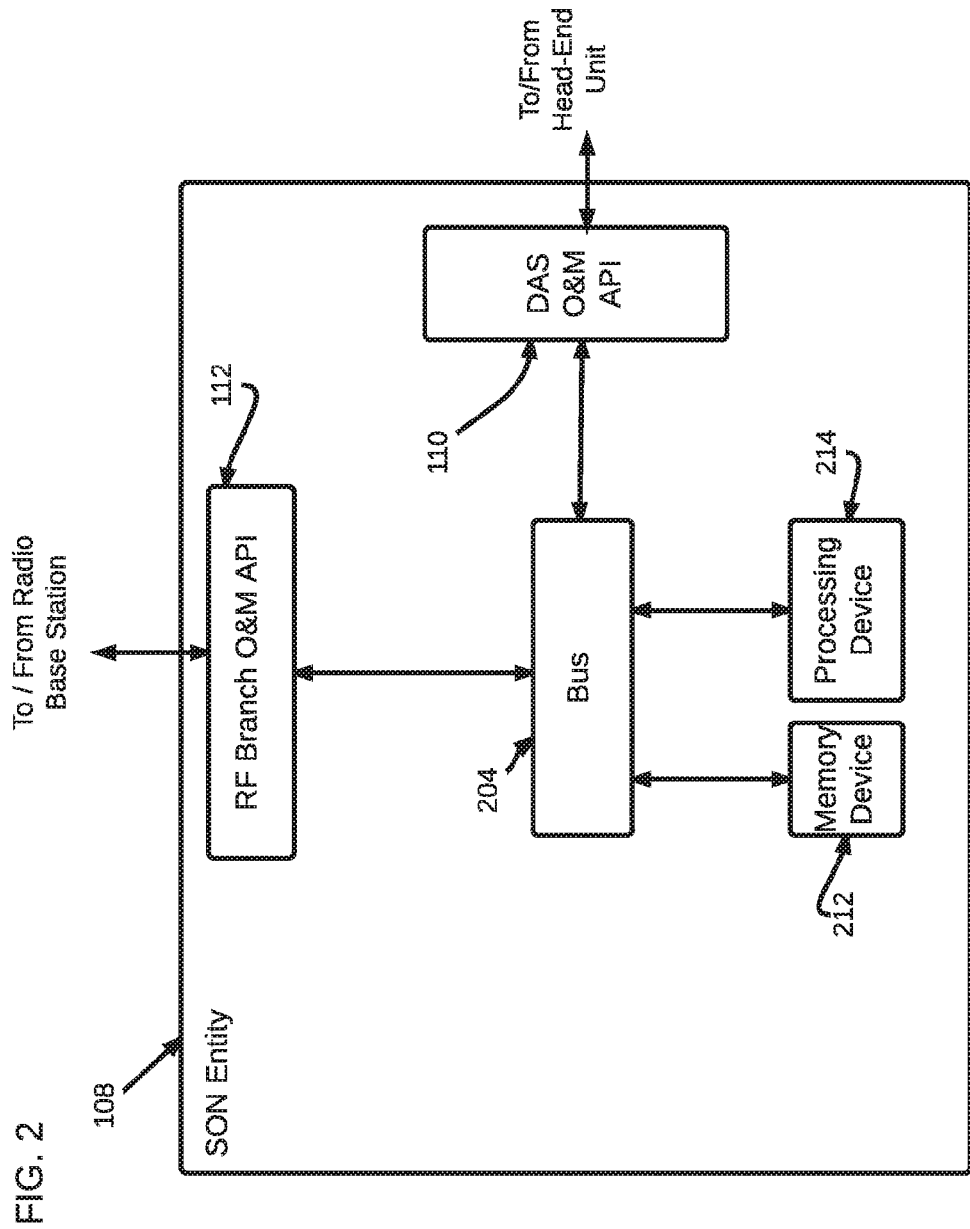
FIG. 2 is a block diagram of an example of a SON entity according to one aspect of the present disclosure.

FIG. 2 is a block diagram depicting an example of a SON entity 108 positioned remotely from the head-end unit 102 according to one aspect. The SON entity 108 can include a system bus 204 that can communicatively couple a processing device 214 with a memory device 212, DAS operations and management API 110, and radio frequency branch operations and management API 112.

The processing device 214 can include any device suitable for executing program instructions to control operation of the SON entity 108. Examples of processing device 214 include a microprocessor, an application-specific integrated circuit (ASIC), a field-programmable gate array (FPGA), or other suitable processor. The processing device 214 may include one processor or any number of processors. The memory device 212 can include any non-transitory media for storing program code defining the operations of the SON entity 108. Non-limiting examples of memory device 212 can include read-only memory (ROM), random-access memory (RAM), optical storage, magnetic storage, flash memory, or any other medium from which the processing device 214 can read program code. The memory device 212 can include program code for defining instructions that, when executed by the processing device 214, determine appropriate adjustments to the radio frequency operations and management parameters for the RBS 118 based on radio frequency parameters provided by the head-end unit 102.

Figure 3:
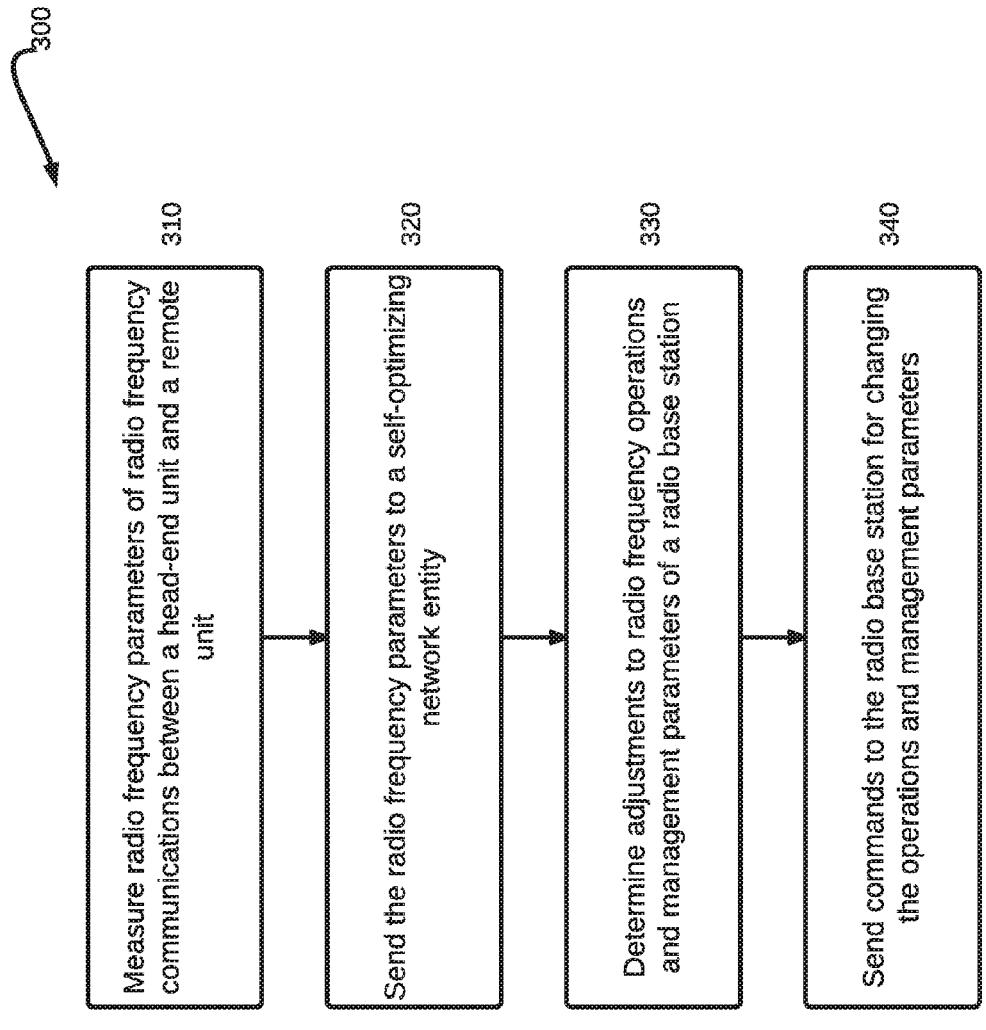
FIG. 3 is a flowchart depicting a process for optimizing the radio frequency operations and management characteristics of an RBS using radio frequency parameters measured at the DAS.

FIG. 3 is a flowchart depicting a process 300 for optimizing an RBS 118 using radio frequency parameters collected from the DAS 120. In block 310, the measurement and configuration module 106 can measure radio frequency parameters pertaining to the radio frequency communications between a head-end unit 102 and remote unit 122 of the distributed antenna system 120. For example, the measurement and configuration module 106 can collect information indicating the radio frequency performance of the DAS 120. Non-limiting examples of radio frequency parameters that the measurement and configuration module 106 can measure are the uplink gain of the DAS 120 (e.g., uplink gain from the remote unit 122 to the head-end unit 102), downlink gain of the DAS 120 (e.g., downlink gain from the head-end unit 102 and the remote unit 122), and signal interference and noise generated by the DAS 120. Additional examples of radio frequency parameters that the measurement and configuration module 106 can measure are signal impairments between the head-end unit 102 and the remote units 122a-b, the number of radio frequency signals being transmitted through the DAS 120, the downlink delay period in transmitting downlink signals from the head-end unit 102 to remote units 122a-b, the uplink delay period in uplink signals provided by the remote units 122a-b to the head-end unit 102, differential delay between multiple-input multiple-output (MIMO) radio frequency branches in the DAS 120, and uplink noise generated by the DAS 120 at the head-end unit 102 output port.

The head-end unit 102 can provide the radio frequency parameters measured by the measurement and configuration module 106 to the SON entity 108, as shown in block 320. For example, the head-end unit can provide the measured parameters via the DAS operations and management API 104. The DAS 120 can be configured to periodically measure radio frequency parameters and provide the measured radio frequency parameters to the SON entity 108. In other aspects, the SON entity 108 can instruct the head-end unit 102 to measure specific radio frequency parameters and send the measured radio frequency parameters to the SON entity 108.

In block 330, the SON entity 108 can determine adjustments to the radio frequency operations and management parameters of the RBS 118 based on the measured radio frequency parameters. Adjusting the radio frequency operations and management parameters of the RBS 118 based on radio frequency performance characteristics of the DAS 120 can optimize overall performance of the telecommunications system by, for example, compensating for noise and latency present in the DAS 120. In some aspects, the carrier (e.g., wireless service provider for the RBS 118) may specify key performance indicators that indicate minimum levels of performance for the RBS 118 and DAS 120. Examples of key performance indicators include a maximum noise floor at the RBS 118 and minimum signal latency for signals transmitted from the RBS 118 through the DAS 120 to connected user devices.

For example, the adjustments to the radio frequency operations and management parameters determined by the SON entity 108 can include compensation for the radio frequency branch delay caused by the DAS 120. In this aspect, the radio frequency parameters measured by the measurement and configuration module 106 can include the delay in providing a downlink signal received from the RBS 118 to a user device via the remote unit 122 (e.g., the delay caused by the extended distance downlink signals travel between the head-end unit 102 and the remote unit 122). The delay to be compensated is the delay between the head-end unit 102 and the remote unit 122 in both the uplink and downlink directions. The radio frequency parameters can also include the delay in providing an uplink signal received at a remote unit 122 to the RBS 118 via the head-end unit 102. Using the measured uplink or downlink signal delay, the SON entity 108 can determine a compensation value for the delay as an adjustment to the radio frequency operations and management parameters. For example, the compensation value due to the delay can include frame synchronization counters.

A more detailed example of adjusting the radio frequency branch delay of the DAS 120 follows. The downlink and uplink delay introduced by the DAS 120 is measured by the measurement and configuration module 106 of the DAS head-end unit 102. The SON entity 108 can adjust the uplink and downlink radio frequency branch delay parameters available at the RBS 118 (e.g., uplink/downlink parameters set through frame synchronization counters) by sending a command to adjust the parameters to the RBS 108 through the radio frequency branch operations and management API 112. The delay introduced by the DAS 120 can be compensated by setting the above mentioned downlink/uplink parameters to the same values of the uplink/downlink delay measured by the DAS 120.

In another aspect, the RBS 108 can adjust the Ncs Cyclic Shift, which is part of the Random Access Channel (RACH) Preamble generation, in order to compensate for the Round Trip (downlink+uplink) Delay (RTD). The Ncs Cyclic Shift, maximum RTD, and channel delay spread due to the over the air propagation are all related to the cell radius. In the case of 3GPP LTE, the relationship between the Ncs Cyclic Shift, maximum RTD, channel delay spread, and cell radius is provided with the following formula:

$$N_{cs} \cdot \frac{\text{Preamble Duration}}{\text{Preamble Length}} \geq RTD + \text{Delay Spread}$$

The Preamble Duration in 3GPP LTE is 800 microseconds and the Preamble Length is 839. The RTD can be calculated as (2× the cell radius)/speed of light. The relationship between Ncs Cyclic Shift, maximum RTD, channel delay spread, and cell radius in LTE is thus:

$$N_{cs} \cdot \frac{800 \text{ μs}}{839} \geq \frac{2 \cdot \text{Cell Radius}}{c(\text{speed of light})} + \text{Delay Spread}$$

The cell radius of the RBS 108 is accordingly:

$$\text{Cell Radius} \leq \left( N_{cs} \cdot \frac{800 \text{ μs}}{839} - \text{Delay Spread} \right) \cdot \frac{3 \cdot 10^8}{2}$$

For example, assuming a Delay Spread of 6 microseconds and an $N_{cs}$ Cyclic Shift value of 119, the cell radius for the RBS 108 is 16 kilometers. By adjusting the Cyclic Shift value, the RBS 108 can thereby adjust the maximum cell radius of the RBS 108, thus compensating for increased delay spread from the DAS 120. To adjust the radio frequency branch delay of the DAS 120, the SON entity 118 can send instructions to the RBS 108 via the radio frequency branch operations and management API 112 to adjust radio frequency parameters pertaining to the Ncs Cyclic Shift value. Additionally, the SON entity 108 can adjust the Ncs Cyclic Shift value based on a desired cell radius. For example, measured radio frequency parameters sent to the SON entity 108 from the measurement and configuration module 106 can include the delay spread and desired maximum cell radius. The SON entity 108 can calculate the appropriate Ncs Cyclic Shift value and provide the adjusted value for the Ncs cyclic shift to the RBS 118.

In another aspect, the adjustments to the radio frequency operations and management parameters can include adjustments to the RBS 118 nominal receive power level for open loop power control. In an open loop power control procedure, the RBS 118 can set the minimum power level at which a user device should transmit to communicate with the carrier network. The nominal receive power level of the RBS 118 corresponds to the minimum power level of uplink signals that should be received by the RBS 118. By increasing the radio frequency operations and management parameters that correspond to the nominal receive power level, the RBS 118 can instruct connected mobile devices to increase transmit power such that incoming uplink signals can be received at the nominal receive power level. For example, the nominal receive power level may be set three decibels higher than a default value to account for a lack of receive diversity in a single receive antenna DAS configuration.

In block 340, the SON entity 108 can send commands to the RBS 118 to change the operations and management parameters using the adjustments determined by the SON entity 108. For example, the SON entity 108 can send commands to the RBS 118 via the radio frequency branch operations and management API 112, as discussed above with respect to FIG. 1. The RBS 118 can change the appropriate operations and management parameters by applying the adjustments determined by the SON entity 108. Changing the operations and management parameters of the RBS 118 can, for example, adjust the downlink and uplink radio frequency branch gains of the RBS 118, compensate for signal delay, adjust the nominal receive power level, or adjust the radio frequency output power of the RBS 118.

Operating the DAS 120 can, in some aspects, result in an increased uplink noise floor at the radio frequency front-end 116 of the RBS 118. Adjustments to the radio frequency operations and management parameters of the RBS 118 can compensate for any uplink noise floor rise at the RBS 118 caused by the DAS 120. For example, the radio frequency parameters provided to the SON entity 108 can include the uplink DAS gain, downlink DAS gain, and uplink DAS noise power level. Based on these measurements, the SON entity 108 can determine adjustments to the radio frequency operations and management parameters of the RBS 118 by determining an updated value for changing the uplink radio frequency branch gain.

Figure 4:
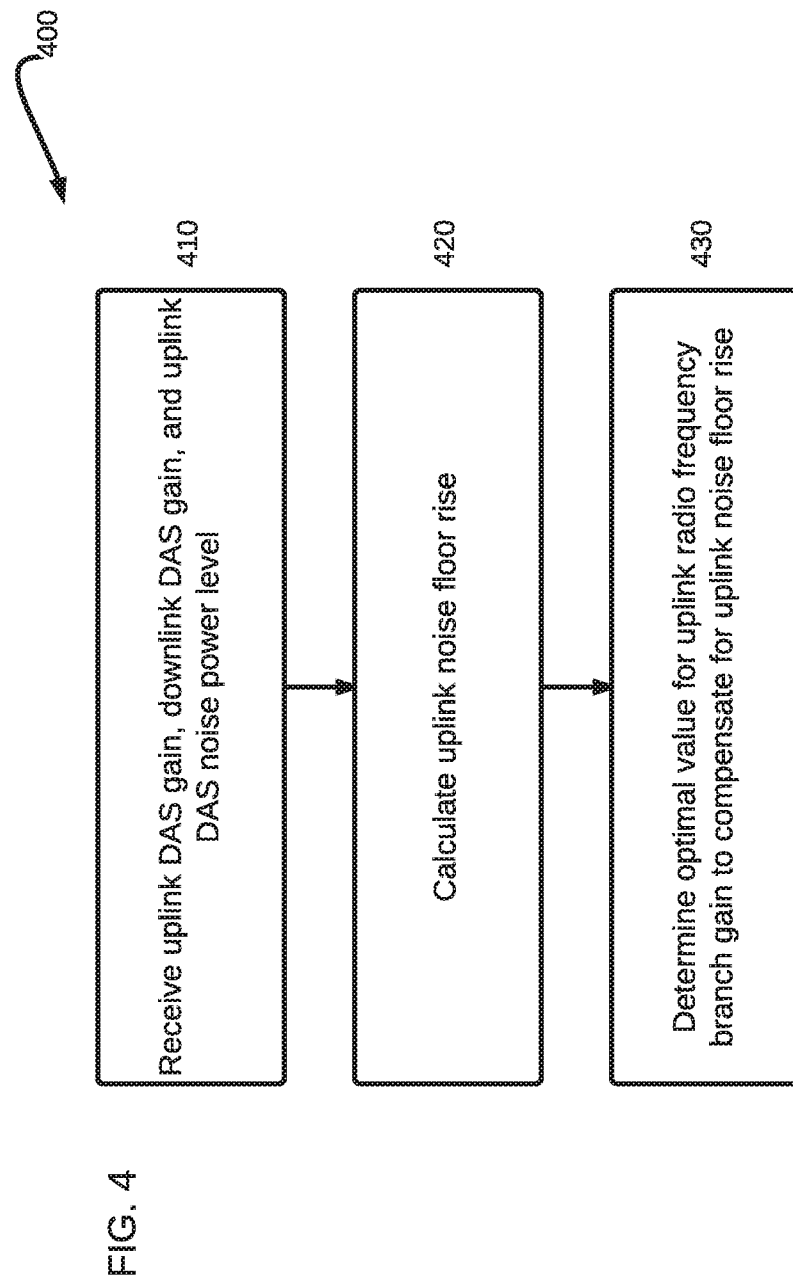
FIG. 4 is a flowchart depicting a process for determining adjustments to the radio frequency operations and management parameters to adjust for an increased noise floor rise at the RBS.

FIG. 4 depicts a flowchart for an example process to determine adjustments to the radio frequency operations and management parameters of the RBS 118 for adjusting for increased noise floor rise at the RBS 118. In block 410, the SON entity 108 can receive the uplink DAS gain, downlink DAS gain, and an uplink DAS noise power level. For example, the SON entity 108 can receive this information from the radio frequency parameters measured and provided by the head-end unit 102.

In block 420, the SON entity 108 can calculate the uplink noise floor rise due to the DAS 120. For example, the uplink noise floor rise can correspond to the difference between the uplink noise power level measured by the RBS 118 and reported to the SON entity 108 with the DAS 120 connected to the RBS 118 and the uplink noise power level measured by the RBS 118 and reported to the SON entity 108 without the DAS 120 connected to the RBS 118. To obtain the uplink noise power level at the RBS 118 without the DAS 120 connected to the RBS 118, the SON entity 108 can disable the radio frequency uplink output of the DAS head-end unit 102. For example, one non-limiting way to disable the radio frequency uplink by the DAS head-end unit 102 is by terminating the output port of the DAS 120 with a 50 ohm load.

Using the uplink noise floor rise, the SON entity 108 can determine the optimal value for the uplink radio frequency branch gain to apply to the RBS 118, as shown in block 430. The optimal value for the uplink radio frequency branch gain can include the amount of gain the RBS 118 should apply to incoming uplink signals from the DAS 120 in order to compensate for the increased noise from the DAS 120. The optimal value for the uplink radio frequency branch gain can be calculated as follows: uplink radio frequency branch gain=uplink DAS gain−downlink DAS gain+uplink DAS noise rise. The SON entity 108 can provide the calculated optimal value for the uplink radio frequency branch gain as adjustments to the radio frequency operations and management parameters for the RBS 118.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A method, comprising:
    measuring radio frequency parameters of radio frequency communications between a head-end unit and a remote unit of a distributed antenna system (DAS);
    sending measurements of the radio frequency parameters to a self-optimizing network (SON) entity, where the SON entity comprises a first operations and management application programming interface (API) and a second operations and management API;
    determining, by the SON entity, adjustments to operations and management parameters of a radio base station (RBS) using the measurements of the radio frequency parameters; and
    sending commands to the RBS for changing the operations and management parameters of the RBS using the adjustments determined by the SON entity.

2. The method of claim 1, wherein the radio frequency parameters include an uplink DAS gain, a downlink DAS gain, and an uplink DAS noise power,
    wherein the adjustments to the operations and management parameters include an updated value for changing an uplink RBS gain.

3. The method of claim 2, wherein the updated value for the uplink RBS gain is determined by calculating an uplink DAS noise rise and summing the uplink DAS noise rise with a difference between the uplink DAS gain and the downlink DAS gain.

4. The method of claim 1, wherein the radio frequency parameters include a signal delay caused by the DAS,
    wherein the adjustments to the operations and management parameters include an updated value for a compensation for the signal delay caused by the DAS.

5. The method of claim 1, wherein the adjustments to the operations and management parameters include an updated value for changing a nominal receive power level of the RBS.

6. The method of claim 1, further comprising:
providing downlink wireless communications from the RBS to one or more remote units of the DAS; and
providing uplink wireless communications from the one or more remote units to the RBS.

7. The method of claim 1, wherein the adjustments to the operations and management parameters are further determined using one or more key performance indicators that include a maximum uplink noise floor level at the RBS.

8. A self-optimizing network (SON) entity, comprising:
a first operations and management application programming interface (API) configured to receive measurements of radio frequency parameters from a head-end unit of a distributed antenna system (DAS), wherein the SON entity is configured to determine adjustments to operations and management parameters of a radio base station (RBS) using measurements of the radio frequency parameters; and
a second operations and management API configured to send commands to the RBS for changing the operations and management parameters of the RBS using the adjustments determined by the SON entity.

9. The SON entity of claim 8, wherein the radio frequency parameters include an uplink DAS gain, a downlink DAS gain, and an uplink DAS noise power,
wherein the adjustments to the operations and management parameters include an updated value for changing an uplink RBS gain.

10. The SON entity of claim 9, wherein the updated value for the uplink RBS gain is determined by calculating an uplink DAS noise rise and summing the uplink DAS noise rise with a difference between the uplink DAS gain and the downlink DAS gain.

11. The SON entity of claim 8, wherein the radio frequency parameters include a signal delay caused by the DAS,
wherein the adjustments to the operations and management parameters include an updated value for a compensation for the signal delay caused by the DAS.

12. The SON entity of claim 8, wherein the adjustments to the operations and management parameters include an updated value for changing a nominal receive power level of the RBS.

13. The SON entity of claim 8, wherein the head-end unit of the DAS is configured to provide downlink wireless communications from the RBS to one or more remote units of the DAS, and wherein the head-end unit is configured to provide uplink wireless communications from the one or more remote units to the RBS.

14. The SON entity of claim 8, wherein the first operations and management API is further configured to receive additional measurements of additional radio frequency parameters from the RBS, wherein the SON entity is further configured to determine additional adjustments to additional operations and management parameters of the head-end unit using the additional measurements of the radio frequency parameters, and wherein the second operations and management API is configured to send commands to the head-end unit for changing the additional operations and management parameters of the head-end unit using the additional adjustments determined by the SON entity.

15. A telecommunications system, comprising:
one or more remote units of a distributed antenna system (DAS);
a head-end unit of the DAS, the head-end unit being configured to measure radio frequency parameters of the DAS, and to provide wireless communications to the one or more remote units of the DAS;
a self-optimizing network (SON) entity communicatively coupled to the head-end unit, wherein the SON entity comprises a first operations and management application programming interface (API) configured to receive measurements of the radio frequency parameters measured by the head-end unit, and a second operations and management API configured to send commands to a radio base station (RBS) for changing operations and management parameters of the RBS using the determined adjustments; and
wherein the SON entity is configured to determine adjustments to the operations and management parameters of the RBS using the measurements of the radio frequency parameters.

16. The telecommunications system of claim 15, wherein the radio frequency parameters include an uplink DAS gain, a downlink DAS gain, and an uplink DAS noise power,
wherein the adjustments to the operations and management parameters include an updated value for changing an uplink RBS gain.

17. The telecommunications system of claim 16, wherein the updated value for the uplink RBS gain is determined by calculating an uplink DAS noise rise and summing the uplink DAS noise rise with a difference between the uplink DAS gain and the downlink DAS gain.

18. The telecommunications system of claim 15, wherein the radio frequency parameters include a signal delay caused by the DAS,
wherein the adjustments to the operations and management parameters include an updated value for a compensation for the signal delay caused by the DAS.

19. The telecommunications system of claim 15, wherein the adjustments to the operations and management parameters include an updated value for changing a nominal receive power level of the RBS.

20. The telecommunications system of claim 15, wherein the adjustments to the operations and management parameters are further based on one or more key performance indicators that include a maximum uplink noise floor level at the RBS.

* * * * *